(12) United States Patent
Tateishi et al.

(10) Patent No.: US 11,500,844 B1
(45) Date of Patent: Nov. 15, 2022

(54) SYNTHETIC DATA CREATION FOR DYNAMIC PROGRAM ANALYSIS

(71) Applicant: INTERNATIONAL BUSINESS MACHINES CORPORATION, Armonk, NY (US)

(72) Inventors: Takaaki Tateishi, Yamato (JP); Yuichi Nakamura, Yokohama (JP); Toshihiro Takahashi, Nakano (JP)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 17/303,401

(22) Filed: May 28, 2021

(51) Int. Cl.
*G06F 16/22* (2019.01)
*G06F 9/455* (2018.01)

(52) U.S. Cl.
CPC ...... *G06F 16/2282* (2019.01); *G06F 9/45516* (2013.01)

(58) Field of Classification Search
CPC . H04M 3/493; G06F 16/2282; G06F 9/45516
USPC .......................................................... 707/804
See application file for complete search history.

(56) References Cited

U.S. PATENT DOCUMENTS

| 7,804,953 | B1 * | 9/2010 | Antonios | ............. | H04M 3/493 |
| | | | | | 379/266.08 |
| 9,613,074 | B2 | 4/2017 | Farahbod | | |
| 2018/0165475 | A1 | 6/2018 | Veeramachaneni | | |
| 2020/0193230 | A1 | 6/2020 | Greven | | |
| 2020/0218638 | A1 * | 7/2020 | Watson | ................. | G06F 40/117 |

OTHER PUBLICATIONS

Rus et al. "Scalable array SSA and array data flow analysis", LCPC'05, DOI: 10.1007/978-3-540-69330-7_27, Corpus ID: 28151693, 2005, pp. 1-19.
https://github.com/Shriya29/Loan-Prediction-/blob/master/PredictiveMod . . . , "Loan-Prediction-/PredictiveModel.ipynb at master • Shriya29/Loan-Predi . . . /", accessed Apr. 30, 2021, pp. 1-11.
IBM: List of IBM Patents or Patent Applications Treated as Related (Appendix P), Jun. 17, 2022, pp. 1-2.
Tateishi et al., "Partial Program Execution With Attribute-Based Data Conversion for Dynamic Program Analysis," Application and Drawings, Filed on Jun. 16, 2022, 32 Pages, Related U.S. Appl. No. 17/807,152.

\* cited by examiner

*Primary Examiner* — Hung T Vy
(74) *Attorney, Agent, or Firm* — Tihon Poltavets

(57) ABSTRACT

A technique for processing a target program is disclosed. In the technique, execution of a target program handling a data structure object is initiated. In the technique, a synthetic data structure object is created by using a mixed data object instead of handling the data structure object in a manner instructed originally in the target program. The mixed data object includes a first data object and a second data object and is configured to redirect a method call to the second data object in response to the first data object being unable to handle the method call.

20 Claims, 12 Drawing Sheets

200

```
class StrFloat:
  def __init__(self, fvalue, svalue=None):         ⎫
    self.fvalue = fvalue                           ⎬ 212
    self.svalue = svalue                           ⎪
    if not self.svalue:                            ⎪
      self.svalue = str(fvalue)                    ⎭ def __getattr__(self, name):                     ⎫
    try:                                           ⎪
      return getattr(self.fvalue, name)            ⎬ 214
    except AttributeError:                         ⎪
      return getattr(self.svalue, name)            ⎭ def __add__(self, x):                            ⎫
    try:                                           ⎪
      return self.fvalue + x                       ⎬ 216
    except (TypeError, ValueError):                ⎪
      return self.svalue + x                       ⎭ def __truediv__(self, x):                        ⎫
    return self.fvalue / x                         ⎬ 218
                                                   ⎭
```
⎬ 210

```

# redefinition of DataFrame.__getitem__

pd.DataFrame.__orig__getitem__ = pd.DataFrame.__getitem__ def modified_getitem(self, key, *args, **kwargs):
  try:
    return pd.DataFrame.__orig__getitem__(self, key, *args, **kwargs)
  except KeyError:
    return pd.Series([StrFloat(1), StrFloat(2)])    ← 232
pd.DataFrame.__getitem__ = modified_getitem
```
⎬ 230

FIG. 4

```

# redefinition of pandas.read_csv
#In the case of using 'TotalIncome','Gender' as
# likely column names

likely_column_names = ['TotalIncome','Gender']
pd.__orig__read_csv = pd.read_csv
def modified_read_csv(self, *args, **kwargs):
  try:
    return pd.__orig__read_csv(self, *args, **kwargs)
  except FileNotFoundError:
    return pd.DataFrame(
      [pd.Series([StrFloat(1),StrFloat(2)]),
       pd.Series([StrFloat(3),StrFloat(4)])],
      # ... (Repate for the number of likely_column_names)
      columns=likely_column_names)
pd.read_csv = modified_read_csv

#Redefinition of Series.apply

pd.Series.__orig__apply = pd.Series.apply
def modified_apply(self, func):
  try:
    return pd.Series.__orig__apply(self, func)
  except AttributeError:
    def newfunc(e):
      return func(StrFloat(e))
    return pd.Series.__orig__apply(self, newfunc)
pd.Series.apply = modified_apply
```

- 234 (top comment block through `likely_column_names = ['TotalIncome','Gender']`)
- 236 (the `pd.DataFrame(...)` return block)
- 238 (Redefinition of Series.apply block)
- 240 (the `def newfunc(e): return func(StrFloat(e))` lines)

```
import pandas as pd          ~252 df = pd.DataFrame()          ~254
print(df['Foo'] + 1)         ~256
```

```
# import a package to monitor the execution
from cek_instr import ir as cek_ir   ~262 import pandas as pd          ~252
import the custom pandas library shown in FIG. 4
# to redefine pandas methods
from cek_instr import cek_pandas as cek_pandas   ~264 insert the collected likely column names
cek_pandas.CONFIG['strings'] =                   ~266
  ['Self_Employed', 'Dependents', 'ApplicantIncome',
   'CoapplicantIncome', 'Gender', 'TotalIncome', '3+',
   'LoanAmount_log', 'RatioLoantoIncome', ...]

# here is the original code
df = pd.DataFrame()          ~254
print(df['Foo'] + 1)         ~256
```

FIG. 6B

```

#A sample code for DataFrame.__getitem__() with
# __add__, __truediv__ method calls

df = pd.DataFrame()
print('__add__:', df['Foo'] + 1)
print('__div__:', df['Foo'] / 2.0)

# A sample code for pandas.read_csv

df = pd.read_csv("foo.csv")
print('read_csv:', df)

# A sample code for Series.apply with
# manipulation to numeric and string

s = pd.Series([1,2])
s = s.apply(lambda s: s+1)
print('__add__:', s)
s = s.apply(lambda s: s.strip())
   print('strip:', s)
```

270 — (first block)
272 — (second block)
274 — (third block)

FIG. 7

SYNTHETIC DATA CREATION FOR DYNAMIC PROGRAM ANALYSIS

BACKGROUND

The present disclosure, generally, relates to program analysis technology, more particularly, to computer-implemented methods, computer systems and computer program products for processing a program.

In a machine learning program, tabular data having a plurality of columns and rows is often used to train an inference model. Dependencies among columns of such tabular data represent domain knowledge, which is useful for semantic automated feature engineering. Meanwhile, dynamic program analysis is useful for analyzing a program to monitor the behavior of the program during the execution. The dynamic program analysis on a program that handles such tabular data requires preparation of actual data, which would be rarely available in the field of the machine learning due to secrecy and license reasons. Also, it is difficult to create a synthetic data set without knowledge about column names and data types. Furthermore, the machine learning program would generate a dataset dynamically during the execution of the program. Static program analyses are not good at handling such tabular data and corresponding operations.

SUMMARY

According to an embodiment of the present invention, a computer-implemented method for processing a target program is provided. The computer-implemented method includes initiating execution of a target program that handles a data structure object. The computer-implemented method also includes creating a synthetic data structure object by using a mixed data object instead of handling the data structure object in a manner instructed originally in the target program. The mixed data object includes a first data object and a second data object and is configured to redirect a method call to the second data object in response to the first data object being unable to handle the method call.

According to other embodiment of the present invention, a computer-implemented method for converting a target program into a modified target program is provided. The computer-implemented method includes obtaining a target program that handles a data structure object. The computer-implemented method also includes injecting, into the target program, code to incorporate a definition of a mixed data object that includes a first data object and a second data object and is configured to redirect a method call to the second data object in response to the first data object being unable to handle the method call. The computer-implemented method further includes injecting, into the target program, code to incorporate a redefinition of a method for creating a synthetic data structure object by using the mixed data object instead of handling the data structure object in a manner instructed originally in the target program.

According to another embodiment of the present invention, a computer system for processing a target program is provided. The computer system includes a processor; and a memory coupled to the processor. The processor is configured to initiate execution of a target program that handles a data structure object. The processor is also configured to create a synthetic data structure object by using a mixed data object instead of handling the data structure object in a manner instructed originally in the target program, in which the mixed data object includes a first data object and a second data object and is configured to redirect a method call to the second data object in response to the first data object being unable to handle the method call.

According to yet another embodiment of the present invention, a computer program product for processing a target program is provided. The computer program product includes a computer readable storage medium having program instructions embodied therewith. The program instructions are executable by a computer to cause the computer to perform a computer-implemented method. The computer-implemented method includes initiating execution of a target program that handles a data structure object. The computer-implemented method also includes creating a synthetic data structure object by using a mixed data object instead of handling the data structure object in a manner instructed originally in the target program. The mixed data object includes a first data object and a second data object and is configured to redirect a method call to the second data object in response to the first data object being unable to handle the method call.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIG. 4 shows a part of example code for defining a string-ish numeric object and a code for redefining a specific method;

FIG. 5 shows another part of the example code for redefining other specific methods;

FIG. 6A shows an instance of a target program;

FIG. 6B shows an instance of a modified target program;

FIG. 7 shows example code using redefined methods;

DETAILED DESCRIPTION

Figure 1:
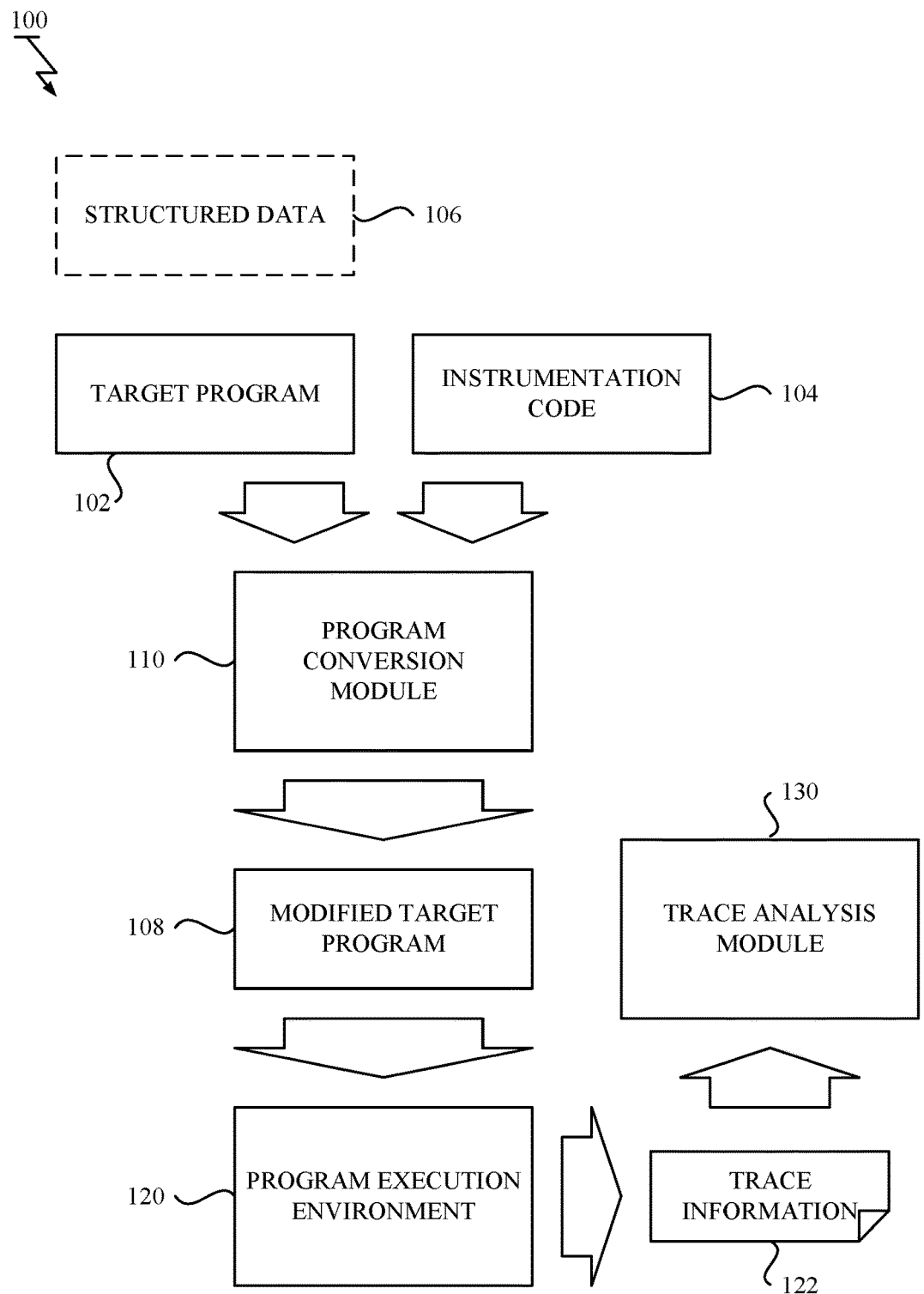
FIG. 1 illustrates a schematic of a dynamic program analysis system according to an exemplary embodiment of the present invention.

Hereinafter, the present invention will be described with respect to particular embodiments, but it will be understood by those skilled in the art that the embodiments described below are mentioned only by way of examples and are not intended to limit the scope of the present invention.

One or more embodiments according to the present invention are directed to computer-implemented methods for processing a target program, which may be written in a programming language that allows a redefinition of a method or function, as well as computer systems and computer program products for performing the computer-implemented method.

In one or more embodiments, the computer-implemented method may include at least one of: initiating execution of a target program that handles a data structure object; and creating a synthetic data structure object by using a mixed data object instead of handling the data structure object in a manner instructed originally in the target program, in which the mixed data object includes a first data object and a second data object and is configured to redirect a method call to the second data object in response to the first data object being unable to handle the method call.

The data structure object instructed in the target program may be a 1-dimensional data structure object or a 2-dimensional data structure object, which may have attribute names (e.g., a label or a name). The synthetic data structure object may also be a 1-dimensional data structure object or a 2-dimensional data structure object, which may have attribute names (e.g., a label or a name). In one or more embodiments, the synthetic data structure object may be created during the execution of the target program (i.e., at runtime).

Assuming that the Python is used as the programming language and the 'Pandas' library, which is a well-known library written in the Python for data manipulation and analysis, is incorporated into the target program, the data structure object may correspond to a 'DataFrame' object or a 'Series' object. The synthetic data structure object may correspond to a 'DataFrame' object or a 'Series' object with the mixed data object.

The mixed data object may be a mixed-type object including a plurality of data objects having different data types, and may be configured to, in response to one data object having certain data type being unable to handle the method call, redirect the method call to another data object having a different data type. In a preferable embodiment, the mixed data object may be a string-ish numeric object that is a combination of a string object and a numeric object. The numeric object may include an integer object, a float object or a complex object, to name but a few. The string-ish numeric object is configured to redirect the method call to one of the numeric object and the string object in response to other of the string object and the numeric object being unable to handle the method call. The string-ish numeric object is an object that can behave as both numeric object and string object.

In a preferable embodiment, the computer-implemented method may further include obtaining a set of possible attribute names for the target program. Handling the data structure object may include reading structured data such as a CSV (Comma Separated Value) file, a TSV (tab-separated value) file, etc., into the data structure object. In the computer-implemented method, creating the synthetic data structure object may include creating, as the synthetic data structure object, a 2-dimensional data structure object with the set of possible attribute names by using the mixed data object.

Assuming that the Python is used and the 'Pandas' library is incorporated into the target program, the data structure object may correspond to 'DataFrame' object that is instructed to have contents read from the structured data, and the 2-dimensional data structure object may corresponds to a 'DataFrame' object having synthetic contents. Handling the data structure object may correspond to being instructed by a 'read_csv' method of the 'Pandas' module. Hence, in this assumption, the 'pandas.read_csv' method may be redefined such that the synthetic 'DataFrame' object is created by using the mixed data object instead of reading the structured data into the 'DataFrame' object in a manner instructed originally in the target program.

In a particular embodiment, before the execution of the target program, the set of possible attribute names may be obtained by parsing the target program and/or a dataset corresponding to the target program followed by enumerating literals as possible attribute names; or receiving the parsed result from an external device that parses the target program and/or the dataset.

In other preferable embodiment, handling the data structure object may include accessing a part of the data structure object (e.g., a column in dataset object) corresponding to a designation (by a name or an index). Creating the synthetic data structure object may include creating, as the synthetic data structure object, a 1-dimensional data structure object by using the mixed data object in response to a failed access to the part of the data structure object. Creating the synthetic data structure object may include further trying to access the part of the data structure object corresponding to the designation and returning the part of the data structure object in response to a successful access to the part of the data structure object.

Assuming that the Python is used and the 'Pandas' library is incorporated into the target program, the data structure object may correspond to a 'DataFrame' object and the part of the data structure object may correspond to a column in the 'DataFrame' object. The 1-dimensional data structure object may correspond to a 'Series' object or a 'DataFrame' object having a single column. Accessing the part of the data structure object may correspond to being instructed by a '_getitem_' method of the 'DataFrame' object. Hence, in this assumption, the '_getitem_' method of the 'DataFrame' object may be redefined such that the synthetic 'Series' or 'DataFrame' object is created by using the mixed data object when the access to the column of the 'DataFrame' object is failed, instead of accessing the column of the 'DataFrame' object in a manner instructed originally in the target program.

In another preferable embodiment, handling the data structure object may include manipulating values in the data structure object in a specified way. Creating the synthetic data structure object may include creating, as the synthetic data structure object, a 1- or 2-dimensional data structure object by using the mixed data object and manipulating values in the synthetic data structure object in the specified way. In one embodiment, manipulating the values in the data structure object in the specified way includes applying a function to the data structure object, where the function defines the specified way to manipulate. Creating the synthetic data structure object includes creating a wrapper function and applying the wrapper function, in which applying the wrapper function includes creating, as the synthetic data structure object, a 1- or 2-dimensional data structure object by using the mixed data object and calling the function with the 1- or 2-dimensional data structure object to manipulate the values in the 1- or 2-dimensional data structure object in the specified way.

Assuming that the Python is used and the 'Pandas' library is incorporated into the target program, the data structure object may correspond to a 'Series' object or a 'DataFrame' object. The 1- or 2-dimensional data structure object may correspond to a 'Series' object or a 'DataFrame' object. Manipulating the values in the data structure object may correspond to being instructed by an 'apply' method of the 'Series' object or an 'applymap' method of the 'DataFrame' object with a designated function (f) defining the specified way to manipulate. Hence, in this case, the 'Series.apply' method (or 'DataFrame.applymap') method may be redefined such that the synthetic 'Series' (or 'DataFrame') object is created by using the mixed data object and the designated function (f) is applied to values in the created synthetic 'Series' (or 'DataFrame') object, instead of applying the designated function to the values in 'Series' (or 'DataFrame') object in a manner instructed originally in the target program.

In a particular embodiment, the execution of the target program may include executing a modified target program that contains the target program at least in part. In this particular embodiment, the modified target program includes code to incorporate a definition of the mixed data object, a redefinition of handling the data structure object and/or the set of possible attribute names. The redefinition defines to perform a creation of the synthetic data structure object in response to a method being called to handle the data structure object in the target program.

In other particular embodiment, the execution of the target program may include executing the target program on a program processing environment. The program processing environment is configured to perform a creation of the synthetic data structure object by intervening in execution of a method to handle the data structure object in the target program. In a particular embodiment, the program processing environment may include an interpreter, Just-In-Time Compiler, to name but a few.

In one or more embodiments, the computer-implemented method may further include outputting trace information relating to attribute names and extracting dependency between the attribute names used in the target program by analyzing the trace information.

In preferable embodiments, the target program to be processed may include at least one of a group consisting of code of handling tabular data, code of loop operation on an array, code of dynamically generating a column, code of defining and/or applying a function with dynamic typing.

One or more other embodiments according to the present invention are directed to computer-implemented methods for converting a target program, which may be written in a programming language that allows a redefinition of a method or function, into a modified target program, which may be written in the same programming language, as well as computer systems and computer program products for performing the computer-implemented method.

In one or more embodiment, the computer-implemented method may include at least one of: obtaining a target program that handles a data structure object; injecting, into the target program, code to incorporate a definition of a mixed data object that includes a first data object and a second data object and is configured to redirect a method call to the second data object in response to the first data object being unable to handle the method call; and injecting, into the target program, code to incorporate a redefinition of a method for creating a synthetic data structure object by using the mixed data object instead of handling the data structure object in a manner instructed originally in the target program.

In a preferable embodiment, the computer-implemented method may further include injecting, into the target program, code to incorporate a set of possible attribute names for the target program. Handling the data structure object may include reading structured data into the data structure object. Creating the synthetic data structure object may include creating, as the synthetic data structure object, a 2-dimensional data structure object with the set of possible attribute names by using the mixed data object.

In other preferable embodiment, handling the data structure object may include accessing a part of the data structure object corresponding to a designation. Creating the synthetic data structure object may include creating, as the synthetic data structure object, a 1-dimensional data structure object by using the mixed data object in response to a failed access to the part of the data structure object.

In another preferable embodiment, handling the data structure object may include manipulating values in the data structure object in a specified way. Creating the synthetic data structure object may include creating, as the synthetic data structure object, a 1- or 2-dimensional data structure object by using the mixed data object and manipulating values in the synthetic data structure object in the specified way.

In one or more embodiments, the computer-implemented method may further include parsing the target program and/or a dataset corresponding to the target program to enumerate literals as the set of possible attribute names. In one or more embodiments, the computer-implemented method may include injecting instrumentation code to output trace information relating to attribute names, wherein the trace information is analyzed to extract dependency between the attribute names used in the target program.

Hereinbelow, referring to a series of FIG. 1 through FIG. 11, a computer-implemented method, a computer system and a computer program product for converting a target program into a modified target program and for performing analysis of the target program based on the modified target program according to an exemplary embodiment will be described.

With reference to FIG. 1, a schematic of a dynamic program analysis system according to an exemplary embodiment of the present invention is described. The dynamic program analysis system 100 shown in FIG. 1 is configured to process and analyze a target program 102, which may be written in a programming language. More specifically, the dynamic program analysis system 100 is configured to convert a target program 102 into a modified target program 108 and perform analysis of the target program 102 based on the modified target program 108 to extract dependencies in structured data such as tabular data that is used in the original target program 102.

As shown in FIG. 1, the dynamic program analysis system 100 may include a program conversion module 110 for converting the target program 102 into the modified target program 108; and a program execution environment 120, on which the modified target program 108 (as well as the original target program 102) runs.

The program conversion module 110 is configured to read the target program 102 and instrumentation code 104 and perform program conversion on the target program 102 by using the instrumentation code 104. The program conversion module 110 is also configured to output the resultant modified target program 108.

In an optional embodiment, the program conversion module 110 may read further structured data 106 (if available), which may be given as a sample dataset appended to the target program 102, to perform the program conversion on the target program 102. In the described embodiment, the program conversion module 110 converts the target program 102 into the modified target program 108 by injecting code into the original target program 102.

The target program 102 is written in the programming language. A programming language that allows a dynamical redefinition of a method (or function) may be preferably employed. A programming language called a dynamic language or a scripting language may be preferably employed. Examples of the programming language for the target program 102 may include Python, Ruby, JavaScript, Java, to name but a few. Note that in the described embodiment, the description will be made assuming that Python is used as the programming language for writing the target program 102.

Also, a program including at least one of a group consisting of code of handling tabular data, code of loop operation on an array, code of dynamically generating a column, code of defining and/or applying a function with dynamic typing may be preferably targeted in the dynamic program analysis system 100. For example, a machine learning program for learning, inference or both often includes such code and is preferably targeted.

The instrumentation code 104 may be written in the same programming language as the target program 102. The instrumentation code 104 may include normal instrumentation code for monitoring the behavior of the target program 102 and specific instrumentation code for defining a mixed data object and redefining one or more specific methods (or functions) using the mixed data object according to the exemplary embodiment of the present invention. Note that, in the described embodiment where the Python is assumed to be employed, the description will be made assuming that 'Pandas' library, which is a well-known library written in the Python for data manipulation and analysis, is imported into the target program 102 and one or more specific methods in the 'Pandas' library are targeted for the redefinition, by reference. A method that returns, creates or manipulates (herein, these operations are collectively referred to as 'handles' or 'handling') a data structure object such as a dataset and/or a column object is targeted as the specific methods to be redefined.

The structured data 106 may be a sample dataset prepared for testing the target program 102 and can be used in the target program 102 during the execution. The structured data 106 may be given in a form of any suitable format, including a CSV (Comma Separated Values) file, a TSV (Tab Separated Values) file, a JSON (JavaScript Object Notation) file, a pickle file (in pickle module for Python), to name but a few. In the described embodiment, the file containing the tabular data is preferably used as the structured data 106. The structured data 106 would contain partial knowledge about the contents of the structured data 106. For example, header information of the CSV file would provide knowledge about the column names.

As described above, the program conversion module 110 converts the target program 102 into the modified target program 108 based on the target program 102 and the instrumentation code 104, and optionally the structured data 106 if available.

The program execution environment 120 is an environment for executing a program written in a particular programming language. The program execution environment 120 may also be referred to as a runtime environment and include an interpreter or a compiler (including Just-In-Time Compiler) depending on the specific of the implementation of the programing language. In the described embodiment, the program execution environment 120 is a standard environment for the programing language.

As described above, the modified target program 108 includes the normal instrumentation code for monitoring the behavior of the program. So, by performing the modified target program 108 on the standard program execution environment 120, the program execution environment 120 may output trace information 122. The trace information 122 is outputted from the program execution environment 120 according to the normal instrumentation code.

Although the instrumentation code 104 includes the normal instrumentation code for monitoring the behavior of the program to obtain the trace information 122 in the described embodiment, in other embodiments, the program execution environment 120 is specifically designed for dynamic program analysis to output trace information 122 without injecting the normal instrumentation code. Hence, in one embodiment, the trace functionality can be built in the program execution environment 120 itself.

As shown in FIG. 1, the dynamic program analysis system 100 according to the exemplary embodiment may further include a trace analysis module 130. The trace analysis module 130 is configured to analyze the trace information 122 obtained from the program execution environment 120. The trace analysis module 130 is configured to analyze the trace information 122 that is dynamically generated during the execution of the modified target program 108 to extract dependencies between the attribute names of the structured data used in the target program 102.

Figure 2:
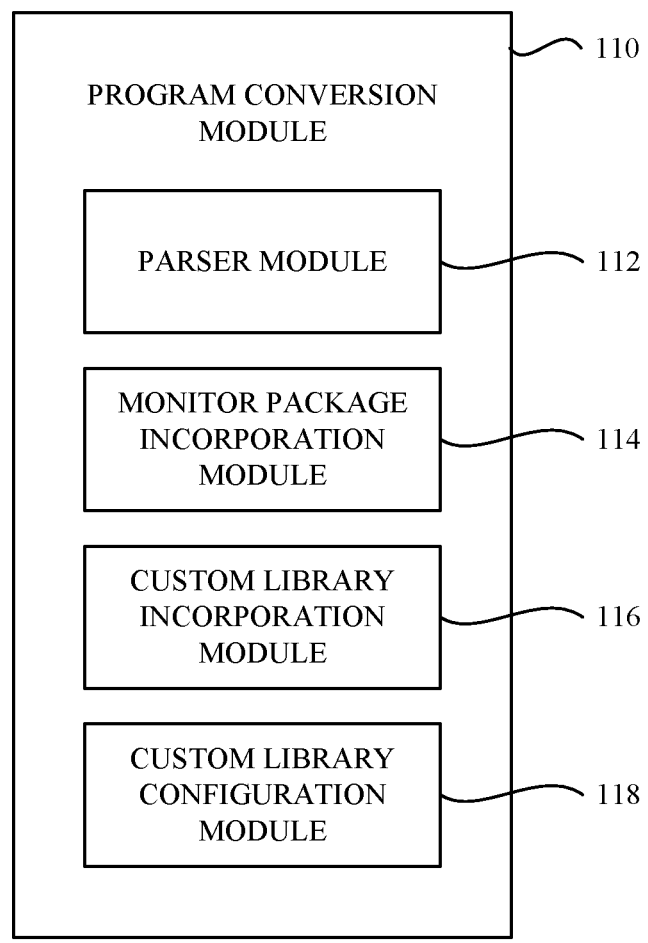
FIG. 2 illustrates a schematic of a program conversion module in the dynamic program analysis system according to the exemplary embodiment of the present invention.

With reference to FIG. 2, a schematic of the program conversion module 110 in the dynamic program analysis system 100 according to the exemplary embodiment is described. As shown in FIG. 2, the program conversion module 110 may include a parser module 112; a monitor package incorporation module 114; a custom library incorporation module 116; and a custom library configuration module 118.

The program conversion module 110 is configured to obtain the target program 102 that includes one or more specific methods, each of which instructs to handle a data structure object. The data structure object instructed in the target program 102 may be a 1-dimensional data structure object or a 2-dimensional data structure object, which may have an attribute name (e.g., a label or a column name). In the embodiment where the Python is used, assuming that the 'Pandas' library is imported into the target program 102, the data structure object may correspond to a 'DataFrame' object or a 'Series' object in the 'Pandas' module.

The parser module 112 is configured to parse the target program 102 and/or the structured data 106 to enumerate literals as a set of possible attribute names (i.e., a set of column names). Any literals observed in the target program 102 and/or the structured data 106 is extracted. For instance, strings between single or double quotations such as 'foo' in the source code of the target program 102 are extracted automatically. For instance, any characters or strings observed as variable names in the source code of the target program 102 may also be extracted since such variables are named according to a predetermine rules in a certain situation. For instance, any literals found in the header of the structured data 106 may also be extracted. In this process, the strings that seem to be column or attribute names are enumerated as much as possible. Even if it allows to enumerate likely names comprehensively, it doesn't matter because the instructions that are actually used would be known when executing the program. However, maximum length of the strings for extraction may be set.

The monitor package incorporation module 114 is configured to inject, into the target program 102, instrumentation code to incorporate a monitor package that is used for outputting trace information relating to attribute names. The trace information can be used to extract dependency between the attribute names used in the target program 102. Any existing monitor package can be employed.

The custom library incorporation module 116 is configured to inject, into the target program, instrumentation code to incorporate a definition of the mixed data object and redefinitions of the specific methods. In the particular embodiment where Python is employed, assuming that the 'Pandas' library is imported to the target program 102, this instrumentation code may be imported into the target program 102 as a custom (or wrapper) library of the 'Pandas' module.

The specific method to be redefined may be characterized as a method for handling the data structure object. Generally, the redefined specific method is configured to create a synthetic data structure object by using the mixed data object and optionally possible attribute names enumerated by the parser module 112, instead of handling the data structure object in a manner instructed originally in the target program. The synthetic data structure object may also be a 1-dimensional data structure object or a 2-dimensional data structure object, which may have an attribute name (e.g., a label or a name). In the particular embodiment where the Python is employed, assuming that the 'Pandas' library is imported, the synthetic data structure object may correspond to a 'DataFrame' object or a 'Series' object with the mixed data object. The mixed data object used to redefine the specific methods will be described in more detail later. Also, examples of the specific methods to be redefined and operations of the redefined methods will be described in more detail later.

The custom library configuration module 118 is configured to inject, into the target program 102, code to incorporate the set of possible attribute names (or column names) for the target program, which are enumerated by the parser module 112. The code for incorporating the set of possible attribute names may configure the settings of the custom library and the set of possible attribute names may be used in the redefined methods incorporated by the custom library incorporation module 116.

In one or more embodiments, each of the modules 110, 120 and 130 shown in FIG. 1 and each of the modules 112, 114, 116 and 118 shown in FIG. 2 may be implemented as a software module including program instructions and/or data structures in conjunction with hardware components such as a processor, a memory, etc.; as a hardware module including electronic circuitry; or as a combination thereof. These modules may be implemented on a single computer device such as a personal computer and a server machine or over a plurality of computer devices in a distributed manner such as a computer cluster of computer devices, client-server system, cloud computing system, edge computing system, etc.

For example, a first computer system implementing the program conversion module 110 may be separate from a second computer system implementing the program execution environment 120 and the trace analysis module 130. In this alternative embodiment, the second computer system may include a module configured to obtain the modified target program that contain the definition of the mixed data object, the redefinition of the specific methods and/or the set of possible attribute names.

Also the target program 102, the instrumentation code 104, structured data 106, modified target program, the trace information 122 and intermediate result may be stored to an appropriate storage, which may be provided by using any internal or external storage device or medium, to which processing circuitry of a computer system implementing these modules is operatively coupled.

Figure 3:
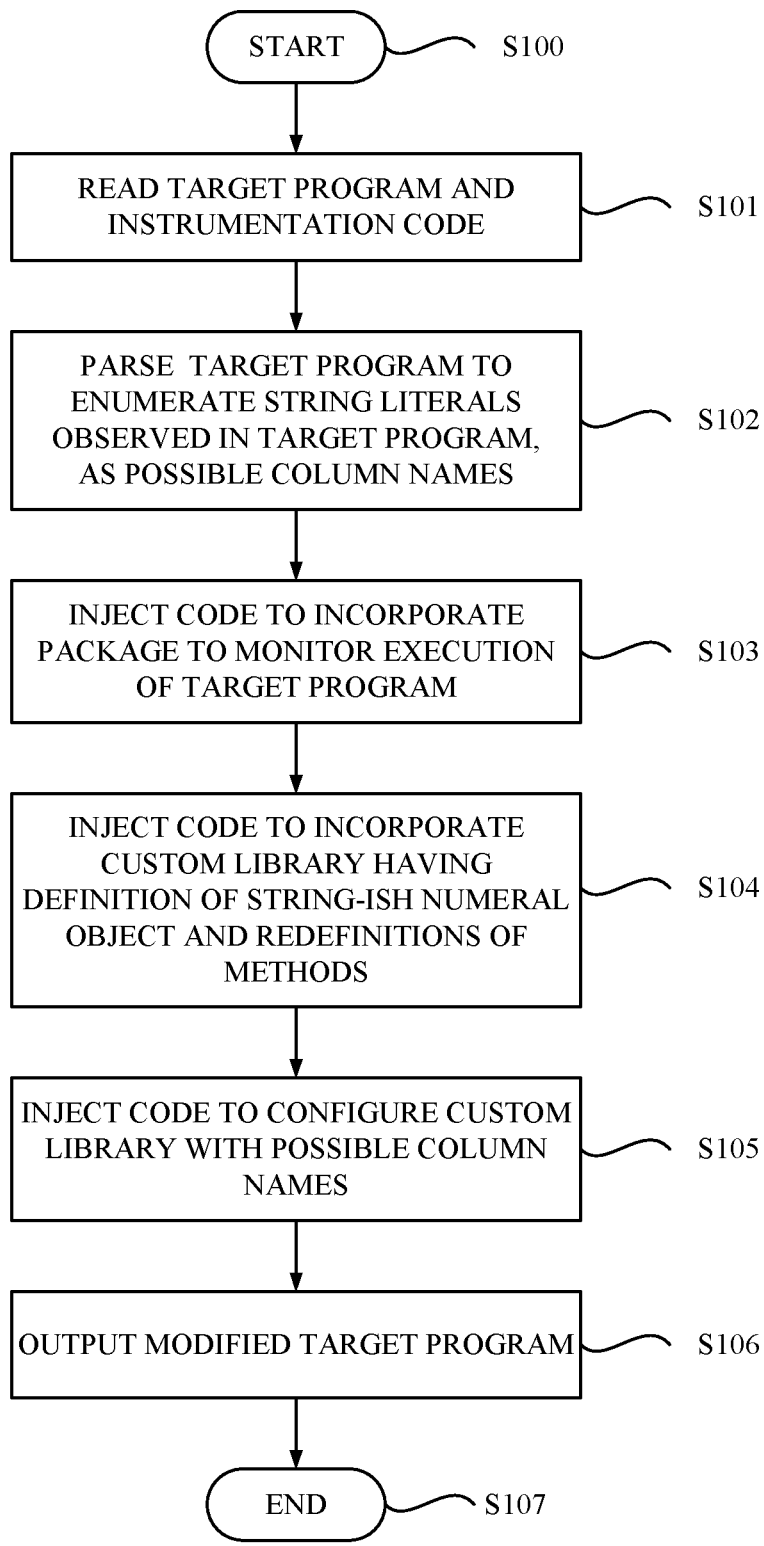
FIG. 3 shows a flowchart of a process for converting a target program into a modified target program according to an exemplary embodiment of the present invention.

Hereinafter, with reference to a series of FIG. 3 through FIG. 7, a process for converting a target program into a modified target program according to an exemplary embodiment of the present invention is described. FIG. 3 shows a flowchart of a process for converting a target program into a modified target program. FIG. 4 shows a part of example code for defining a mixed data object (that is an object named as a 'string-ish numeric' object in the described embodiment) and example code for redefining a specific method. FIG. 5 shows a part of the example code for defining other specific methods. FIG. 6A and FIG. 6B show instances of a target program and a modified target program, respectively. FIG. 7 shows example code using redefined methods.

Note that the process shown in FIG. 3 may be performed by processing circuitry such as a processing unit of a computer system that implements the program conversion module 110 and its submodule shown in FIG. 1 and FIG. 2.

The process shown in FIG. 3 may begin at step S100 in response to receiving, from an operator, a request for performing program conversion with a designation of a target program 102 and the instrumentation code 104, and the structured data 106 if available. However, the way to initiate the process is not limited, and in other embodiments the process may begin in response to any event.

At step S101, the processing unit may read the target program 102 and the instrumentation code 104, which are designated in the request. In the described embodiment, the structured data 106 is assumed to be not designated and the merely the source codes of the target program 102 and the instrumentation code 104 is given.

At step S102, the processing unit may parse the target program 102 to enumerate literals as a set of possible attribute names.

At step S103, the processing unit may inject, into the target program 102, instrumentation code to incorporate a package to monitor the execution of the target program 102, which instructs to output the trace information.

At step S104, the processing unit may inject, into the target program 102, code to incorporate a custom library having the definition of the mixed data object and redefinitions of the specific methods.

The incorporation of the definition of the mixed data object and the redefinition of the specific methods is done by either injecting code to import the package of the custom library having these definition and redefinition or by injecting code of these definition and redefinition.

The mixed data object used to redefine the specific methods may be a mixed-type data object including a plurality of data objects with different data types. The mixed-type data object may be configured to, in response to one data object having certain data type being unable to handle the method call (i.e., there is no corresponding method for the data type), redirect the method call to another data object having a different data type. In the described embodiment, the mixed data object is a string-ish numeric object that is a combination of a string object and a numeric object. The string-ish numeric object is configured to redirect the method call to one of the numeric object and the string object (e.g., string object) in response to other of the string object and the numeric object (e.g. numeric object) being unable to handle the method call. The numeric object may include an integer object, a float object and a complex object, in the case of the python. Also, the combination of the numeric and string objects is an example, but this combination is effective for a program that handles a tabular data since such tabular data mostly uses the numeric or the string as data types. However, any other combination of data type objects may also be contemplated.

The general behavior of the string-ish numeric object is as follows: Let us assume 'O' is created with a string object 'S', which is then kept by 'O'. If the object 'O' has the method 'M', the method 'M' of the object 'O' is called. Otherwise, the method 'M' of the string object 'S' is called.

Example code for defining the string-ish numeric object is shown in FIG. 4. As shown in FIG. 4, there is a definition of the string-ish numeric object (class StrFloat) 210 that includes definitions of four methods of the string-ish numeric object, including a definition of constructor method (_init_) 212, a definition of a '_getattr_' method 214 to return an attribute when an undefined attribute is accessed, a definition of an add method 216 that is called by a '+' operator and a definition of a true division method 218 that is called by a '/' operator.

The constructor method 212 creates and/or takes a float object (self.fvalue) and a string object (self.svalue). The '_getattr_' method 214 tries to return the attribute of the float object at first when an undefined attribute is accessed. If an attribute error occurs, the method returns the attribute of the string object. The add method 216 tries to arithmetically add a value given as an argument to the float object. If a type error or value error occurs, the method returns a concatenation of a value of the string object and a value given as the argument. The true division method 218 arithmetically divides a value of the float object by a value given as an argument. The true division method 218 is a method that merely the numeric objects have.

The custom library injected into the target program 102 in the step S104 includes further code to incorporate redefinitions of one or more specific methods, each of which instructs to create a synthetic data structure object by using the string-ish numeric object instead of handling a data structure object in a manner instructed originally in the target program 102. Hereinbelow, more details of the specific methods to be redefined and the operations of the redefined methods are described.

In the particular embodiment where Python is employed, assuming that the 'Pandas' library is imported, there may be mainly three types of the methods to be redefined. As described above, the specific method to be redefined may be characterized as a method for handling the data structure object. The data structure object may correspond to a 'DataFrame' object or a 'Series' object in the 'Pandas' module in this assumption.

In the 'Pandas' library, there are (i) a first type method that returns a data structure object (e.g., 'pandas.read_csv' method that returns a 'DataFrame' object having contents of CSV file), (ii) a second type method that accesses a part of a data structure object (e.g., 'DataFrame._getitem_' method that accesses a column in a 'DataFrame' object), (iii) a third type method that manipulates values in a data structure object in a specified way (e.g., 'Series.apply' method that applies a specified function to each value in a 'Series' object).

As for the first type method (i), the 'pandas.read_csv' method is a method for reading structured data (CSV file) into a data structure object ('DataFrame' object). The redefined method instructs to create a synthetic 2-dimensional data structure object ('DataFrame' object) with the set of possible attribute names extracted in the step S102 by using an array of string-ish numeric objects and to return the created synthetic 2-dimensional data structure object. Each string-ish numeric object has a dummy value. The number of columns in the synthetic 2-dimensional data structure object may be equal to the number of the extracted attribute names. The number of rows or records in the synthetic 2-dimensional data structure object is not limited and several (e.g., 5-10) rows are created.

As for the second type method (ii), the 'DataFrame._getitem_' method is a method for accessing a part of the data structure object (a column in a 'DataFrame' object) corresponding to a designation (by a name or an index). The redefined method instructs to try to access the part of the data structure object (a corresponding column in a 'DataFrame' object), return it in response to a successful access. In response to a failed access, the redefined method instructs to create a 1-dimensional data structure object (a 'Series' object) by using a collection of string-ish numeric objects and return the created synthetic 1-dimensional data structure object. Each string-ish numeric object has a dummy value.

As for the third type method (iii), 'Series.apply' method is a method for applying a specified function to a data structure object ('Series' object). The 'Series.apply' method manipulates values in the 'Series' object in a specified way that is defined by the specified function. The redefined method instructs to create a 1-dimensional data structure object ('Series' object) by using a collection of string-ish numeric objects and manipulate values in the 1-dimensional data structure object in the specified way given as the function.

More specifically, given that the method takes a function (f), the redefined method creates a wrapper function (g) and calls the original 'Series.apply' method with the wrapper function (g) where the wrapper function (g) creates a synthetic 1-dimensional data structure object and calls the function (f) with the synthetic 1-dimensional data structure object. The synthetic 1-dimensional data structure object is a collection of string-ish numeric objects. Each string-ish numeric object has a dummy value. Note that in the 'Pandas' module the 'DataFrame' object has an 'applymap' method and the redefinition of the 'DataFrame.applymap' method may also be contemplated in this assumption.

FIG. 4 also shows code 230 for redefining a specific method. The method whose redefinition is described in the code of FIG. 4 is the 'DataFrame._getitem_' method. As shown in FIG. 4, the redefined method tries to perform an original 'DataFrame._getitem_' method to return a designated column of the 'DataFrame' object at first. If a key error occurs, the method then creates a 'Series' object with a collection of string-ish numeric objects ([StrFloat(1), StrFloat(2)] as indicated by the numeral 232 in this code) and return the created synthetic 'Series' object.

FIG. 5 shows code 234, 238 for redefining other two specific methods. The methods whose redefinitions are described in the code of FIG. 5 are the 'pandas.read_csv' method and the 'Series.apply' method.

As shown in FIG. 5, the redefined 'pandas.read_csv' method tries to perform an original 'pandas.read_csv' method to return a 'DataFrame' object having contents of the designated structured data at first. If a file-not-found error occurs, the method then creates a 'DataFrame' object with a array of string-ish numeric objects (pd.Series([StrFloat(1), StrFloat(2)]), pd.Series([StrFloat(3), StrFloat(4)]), . . . as indicated by the numeral 236 in this code) and return the created synthetic 'DataFrame' object.

As shown in FIG. 5, the redefined 'Series.apply' method tries to perform an original 'Series.apply' method with an original function (func) to return a result of applying the original function (func) at first. If an attribute error occurs, the method then creates a wrapper function (newfunc) and calls the original 'Series.apply' method with the wrapper function (newfunc) where the wrapper function (newfunc (e)) creates a string-ish numeric object for each value (StrFloat(e) as indicated by the numeral 240 in this code) and calls the original function (func) with the string-ish numeric object to return the result.

The redefined method may be characterized as a method for creating a synthetic data structure object by using the mixed data object (more specifically, the string-ish numeric object) to return the result after trying the original method if necessary.

Referring back to FIG. 3, at step S105, the processing unit may inject, into the target program, code to configure the custom library imported at step S104 by inserting the set of possible attribute names for the target program, which is extracted in the step S102. Note that the redefined first type method is configured by this configuration code such that the synthetic 2-dimensional data structure object is created with these possible attribute names as column names.

At step S106, the processing unit may output the modified target program 108 containing the injected code and the original code of the target program 102 and the process shown in FIG. 3 may end at step S107.

FIG. 6A shows an instance of the target program 102 and FIG. 6B shows an instance of the modified target program 108 converted from the target program 102 shown in FIG. 6A. In the code 250 of the original target program 102 shown in FIG. 6A, the first code 252 instructs to import the module of the original library. The second code 254 instructs to assign the 2-dimensional data structure object to a variable (df). The third code instructs to print a result of adding one to values in a column named as 'Foo' in this 2-dimensional data structure object.

In the code 260 of the modified target program 108, the injected code is represented in bold. The injected code 262 instructs to import an 'ir' module from a 'cek_instr' package for monitoring the execution. The code 264 after the original first code 252 instructs to import a 'cek_pandas' module from the 'cek_instr' package to redefine one or more specific methods. The code 266 instructs to configure 'cek_pandas' module with a string list that includes the set of possible attribute names extracted at step S102. The original code 252, 254 and 256 in the target program is unchanged.

FIG. 7 shows example code using redefined methods. The first code 270 is sample code for the 'DataFrame._getitem_' method with '_add_' and '_truediv_' methods. The second code 272 is sample code for the 'pandas.read_csv' method that creates dataset object even if there is no designated file. The third code 274 is sample code for the 'Series.apply' method whose argument accepts a numeric manipulation (arithmetic addition) and a string manipulation (strip function).

The modified target program 108 that is obtained by the process shown in FIG. 3 and illustrated in FIG. 6B is a program modified to be executable on the program execution environment 120 without requiring an actual dataset and without changing a main part of the original program. The modified target program 108 can be used to perform the dynamic program analysis. By using a mixed-type data object, more specifically, the string-ish numeric object, to redefine the specific methods, data type inconsistency is prevented.

Figure 8:
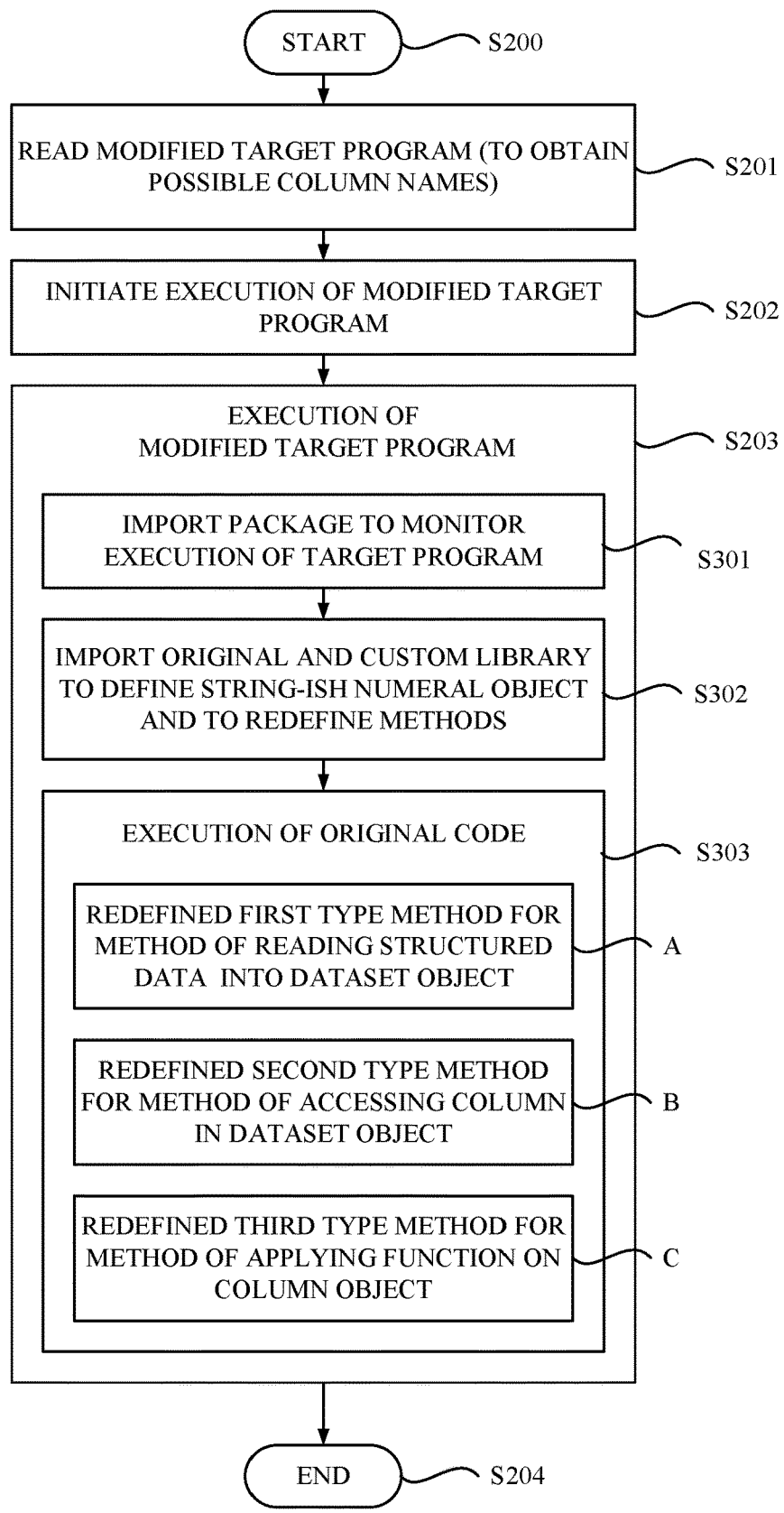
FIG. 8 shows a flowchart of a process of executing a modified target program according to an exemplary embodiment of the present invention.
Figure 9:
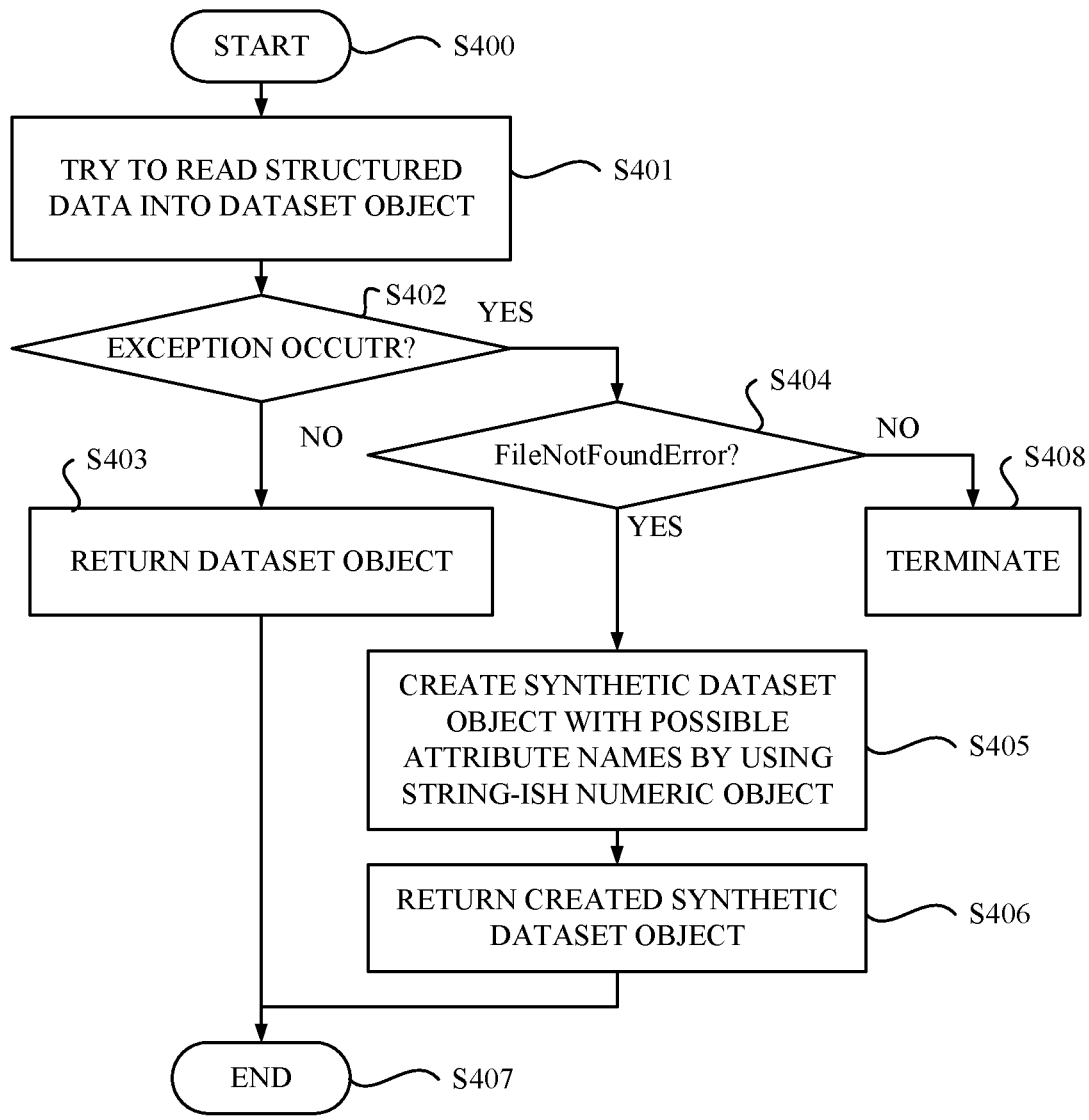
FIG. 9 shows a flowchart of operation of a redefined method for a method of reading structured data into a dataset object in the modified target program according to the exemplary embodiment of the present invention.
Figure 10:
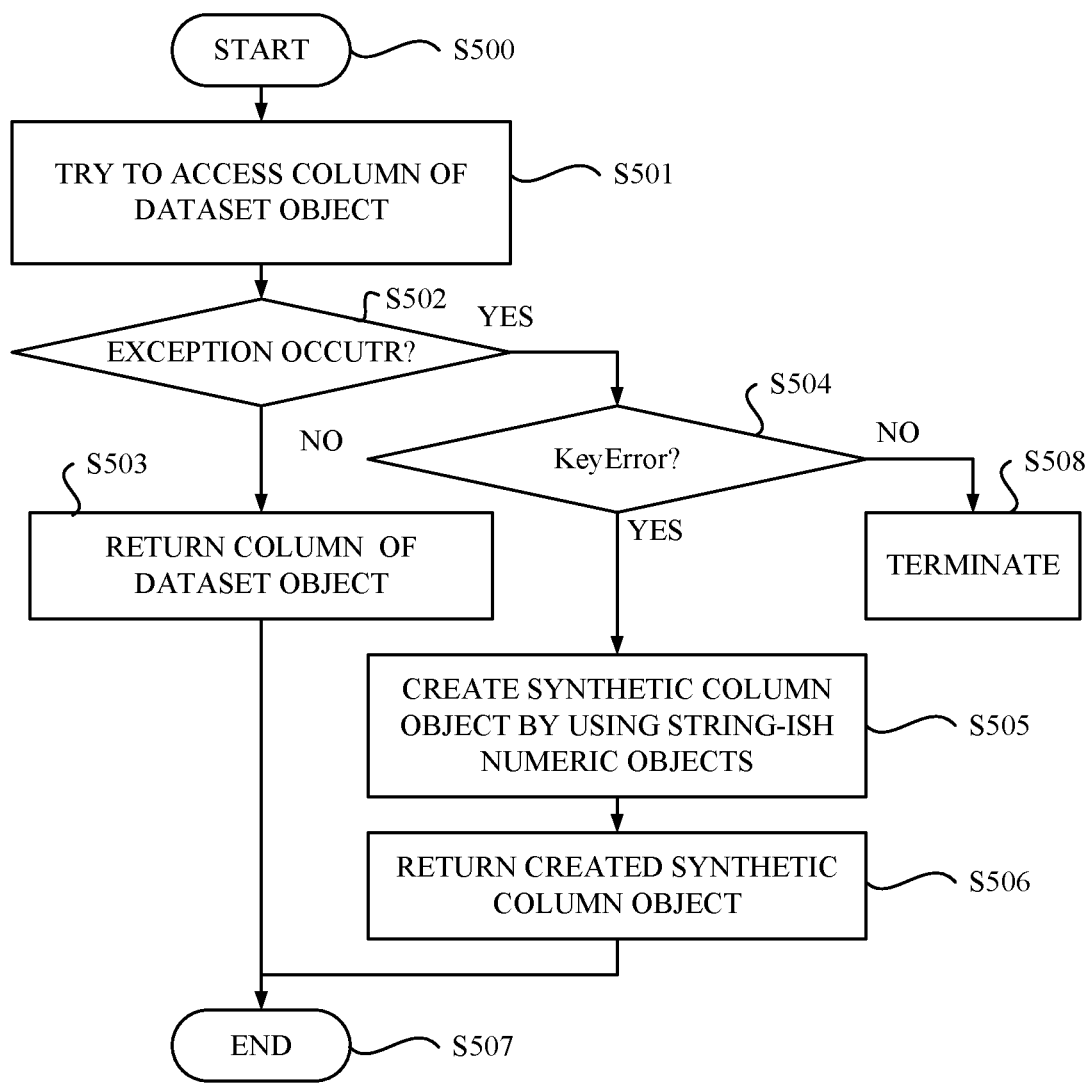
FIG. 10 shows a flowchart of operation of a redefined method for a method of accessing a part of a dataset object in the modified target program according to the exemplary embodiment of the present invention.
Figure 11:
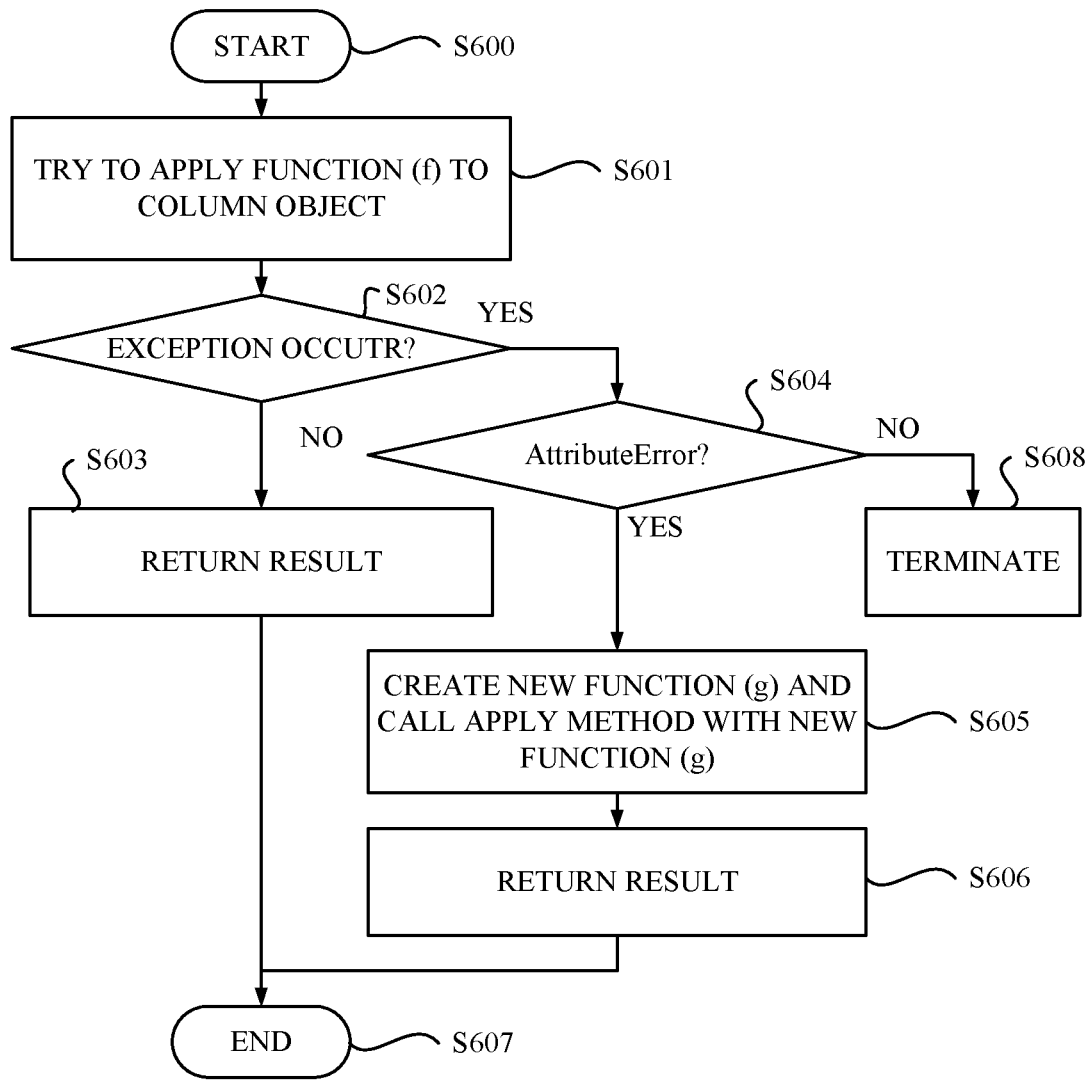
FIG. 11 shows a flowchart of operation of a redefined method for a method of manipulating values in a column object in the modified target program according to the exemplary embodiment of the present invention.

Hereinafter, with reference to a series of FIG. 8 through FIG. 11, a process of executing a modified target program according to an exemplary embodiment of the present invention is described. FIG. 8 shows a flowchart of a process of executing a modified target program 108. FIG. 9, FIG. 10 and FIG. 11 show flowcharts of operations of three redefined methods that are performed during the execution of the modified target program 108. Note that the process shown in FIG. 8 and the operation shown in FIG. 9, FIG. 10 and FIG. 11 may be performed by processing circuitry such as a processing unit of a computer system that implements the program execution environment 120 shown in FIG. 1 and executes the modified target program.

The process shown in FIG. 8 may begin at step S200 in response to receiving, from an operator, a request for executing the modified target program 108. However, the way to initiate the process is not limited, and in other embodiments the process may begin in response to any event.

At step S201, the processing unit may read the modified target program 108. In the step S201, the set of possible attribute names, which is inserted as the code 266 in the modified target program 108 shown in FIG. 6B is obtained.

At step S202, the processing unit may initiate the execution of the modified target program 108. At step S203, the processing unit may execute the modified target program 108 and then the process may end at S204.

During the execution of the modified target program 108 in step S203, the processes from step S301 to step S303 are performed. At step S301, the processing unit may execute code to import a package to monitor the execution of the target program 102. At step S302, the processing unit may execute code to import an original library and a custom library for defining the string-ish numeric object and for redefining the specific methods defined in the original library. At step S303, the processing unit may execute the original part of the code in the target program 102.

During the execution of the original code, at step A, in response to a first type method of reading structured data into a 2-dimensional data structure object (referred to as a dataset object) being called, the processing unit may call the redefined first type method.

Also, during the execution of the original code, at step B, in response to a second type method of accessing a column in a dataset object being called, the processing unit may call the redefined second type method.

Further, during the execution of the original code, at step C, in response to a third type method of applying a function on a 1-dimensional data structure object (referred to as a column object) being called, the processing unit may call the redefined third type method.

Note that the sequence of these methods and the number of times each method is called during the execution of the target program and the modified target program are not limited.

FIG. 9 shows a flowchart of operation of redefined method for a method of reading structured data into a dataset object in the modified target program. The operation shown in FIG. 9 may begin at step S400 in response to the first type method being called at step A in FIG. 8.

At step S401, the processing unit may try to read designated structured data into a dataset object. If no exception occurs (NO in step S402), the control proceeds to step S403. At step 403, the processing unit may return the dataset object having contents read from the designated structured data, and the operation ends at step S407.

If an exception occurs (YES in step S402), the control proceeds to step S404. At step 404, a determination is made further as to whether the exception indicates file-not-found error or not. If the exception indicates the file-not-found error (YES in step S404), the processing unit may create a synthetic dataset object with possible attribute names by using the string-ish numeric object for each possible attribute name. At step S406, the processing unit may return the created synthetic dataset object and then the operation may end at step S407. The operation shown in FIG. 9 is performed instead of handling a dataset object in a manner instructed originally in the target program 102, i.e., instead of reading designated structured data into the dataset object. The synthetic dataset object is created in response to a failure of the original method. If the exception is an exception other than the file-not-found error (NO in step S404), the processing unit may terminate the operation at step S408.

FIG. 10 shows a flowchart of operation of redefined method of accessing a part of a dataset object in the modified target program. The operation shown in FIG. 10 may begin at step S500 in response to the second type method being called at step B in FIG. 8.

At step S501, the processing unit may try to access a column of the dataset object corresponding to the designation. If no exception occurs and the access is successful (NO in step S502), the control proceeds to step S503. At step 503, the processing unit may return the column of the dataset object and the operation ends at step S507.

If an exception occurs and the access is failed (YES in step S502), the control proceeds to step S504. At step 504, a determination is made further as to whether the exception indicates key error or not. If the exception indicates the key error (YES in step S504), the processing unit may create a synthetic column object by using a collection of string-ish numeric objects. At step S506, the processing unit may return the created column object and then the operation may end at step S507. The operation shown in FIG. 10 is performed instead of handling a dataset object in a manner instructed originally in the target program 102, i.e., instead of accessing a column in the dataset object. The synthetic column object is created in response to a failed access (and in the case where the failed access is due to a key error). If the exception is an exception other than the key error (NO in step S504), the processing unit may terminate the operation at step S508.

FIG. 11 shows a flowchart of operation of redefined method for manipulating values in a column object in the modified target program. The process shown in FIG. 11 may begin at step S600 in response to the third type method being called at step C in FIG. 8.

At step S601, the processing unit may try to apply a function (f) to the column object. If no exception occurs (NO in step S602), the control proceeds to step S603. At step 603, the processing unit may return the result of applying the original function (f) and the operation ends at step S607.

If an exception occurs (YES in step S602), the control proceeds to step S604. At step 604, a determination is made further as to whether the exception indicates an attribute error or not. If the exception indicates the attribute error (YES in step S604), the processing unit may create a wrapper function (g) and call an original apply method of the column object with the wrapper function (g). At step S606, the processing unit may return the result of applying the wrapper function (g) and the operation ends at step S607.

In the aforementioned embodiment, the execution of the target program shown in FIG. 8 and the operation shown in FIG. 9, FIG. 10 and FIG. 11 are described to be performed by executing the modified target program containing the target program on the standard program execution environment 120. The modified target program includes code to incorporate the definition of the string-ish numeric object, the redefinition of the specific methods and/or the set of possible attribute names. However, a way of performing the target program without requiring the actual dataset is not limited to the aforementioned embodiment.

In alternative embodiments, the execution of the target program is performed by executing the original target program on a specially designed program processing environment. In the alternative embodiments, the target program is executed on the program processing environment that is configured to perform the creation of the synthetic data structure object by intervening in the execution of the method to handle the data structure object in a manner instructed in the original target program as given.

Hereinbelow, an experimental study on the execution of the modified target program according to the exemplary embodiment of the present invention is described. An original target program and a modified target program of an open-source machine learning program written in Python according to the exemplary embodiment were executed with a dataset having 615 entries and 13 columns and without any dataset, respectively. The open-source machine learning program was LoanPrediction (https://github.com/Shriya29/Loan-Prediction-/blob/master/PredictiveModel.ipynb). The time to complete the program was measured. In this experiment, three methods ('pandas.read_csv', 'DataFrame._get-item_', 'Series.apply' methods in the 'Pandas' library) were redefined. As for Comparative Example 1, executing the original target program with the actual dataset took 73.8 seconds to complete. As for Example 1, executing the modified target program without the actual dataset took only 12.6 seconds, which is 6 times faster than executing the target program in a manner originally instructed. Thus, it was demonstrated that the novel program conversion method enables to improve efficiency of dynamic program analysis.

According to the aforementioned embodiments of the present invention, computer-implemented methods, computer systems and computer program products capable of executing a target program handling a data structure object without requiring actual dataset and knowledge about data types of the dataset are provided. Furthermore, computer-implemented methods, computer systems and computer program products for converting a target program handling a data structure object into a modified target program that is executable without requiring actual dataset and knowledge about data type of the dataset are provided.

In the technique, a synthetic data structure object is created by using a mixed data object instead of handling the data structure object in a manner instructed originally in the target program. The mixed data object includes a plurality of data objects, which may have different data types, and is configured to redirect a method call to other data object in response to one data object being unable to handle the method call. Therefore, even though the knowledge about the data type is missing, the technique prevents data type inconsistency from occurring during the execution of the target program.

In the technique, the synthetic data structure object is created preferably with the possible attribute names observed in the target program. Hence, even though knowledge about the attribute names is missing, the technique prevents errors during the execution of the target program.

By utilizing the modified target program, dependency among elements of the data structure object, which represents domain knowledge useful for semantic automated feature engineering, can be extracted. For example, calculation formula involving several columns may be implemented in the target program as domain knowledge. Such dependency can be extracted by performing the dynamic program analysis.

As described above, even though the dynamic program analysis is useful for analyzing a program to monitor the behavior of the program during the execution, the dynamic program analysis would require preparation of actual data, which is often not available due to secrecy and/or license reasons. Also, it is difficult to create a synthetic data set without knowledge about data types and the names. Furthermore, the machine learning program would generate a dataset dynamically during the execution of the program such as one-hot encoding. Static analysis is not good at handling tabular data, loop operation on an array, dynamically generating a column and defining a function with dynamic typing, which are often observed in the machine learning programs.

Also, even if the dataset is available, the size of the dataset is often too huge, which makes the dynamic analysis inefficient. The overhead is not negligible since the information are acquired each time it is needed at runtime in the dynamic analysis, which increases execution time. A naive size reduction method sometimes causes runtime errors due to the missing of the columns, which are originally created by operations (e.g., one-hot encoding) on the original dataset. According to the described embodiments, it is possible to execute the target program in a way that solves the problem that a dataset of the required size does not exist.

Although the advantages obtained with respect to the one or more specific embodiments according to the present invention have been described, it should be understood that some embodiments may not have these potential advantages, and these potential advantages are not necessarily required of all embodiments.

Computer Hardware Component

Figure 12:
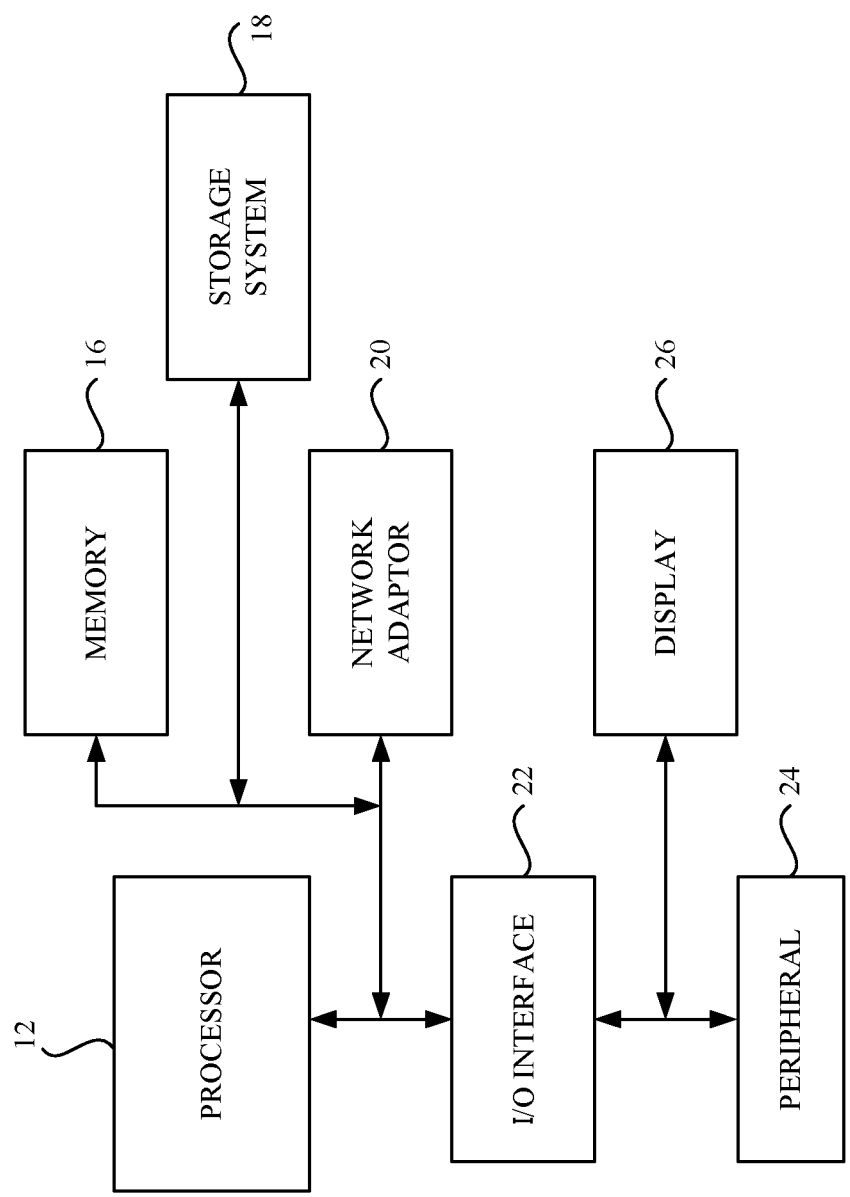
FIG. 12 depicts a schematic of a computer system according to one or more embodiments of the present invention.

Referring now to FIG. 12, a schematic of an example of a computer system 10, which can be used for the dynamic program analysis system 100, is shown. The computer system 10 shown in FIG. 12 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 12, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, steps, layers, elements, and/or components, but do not preclude the presence or addition of one or more other features, steps, layers, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for processing a target program, comprising:
    responsive to initiating execution of the target program handling a data structure object, executing a modified target program containing the target program at least in part, the modified target program includes code to incorporate a definition of the mixed data object, a redefinition of handling the data structure object and/or a set of possible attribute names, the redefinition defining to perform a creation of the synthetic data structure object in response to a method being called to handle the data structure object in the target program; and
    creating a synthetic data structure object by using a mixed data object instead of handling the data structure object in a manner instructed originally in the target program, the mixed data object includes a first data object and a second data object and being configured to redirect a method call to the second data object in response to the first data object being unable to handle the method call.

2. The computer-implemented method of claim 1, further comprising:
    obtaining the set of possible attribute names for the target program, wherein handling the data structure object includes reading structured data into the data structure object, and creating the synthetic data structure object includes creating, as the synthetic data structure object, a 2-dimensional data structure object with the set of possible attribute names by using the mixed data object.

3. The computer-implemented method of claim 1, wherein handling the data structure object includes accessing a part of the data structure object corresponding to a designation, and creating the synthetic data structure object includes creating, as the synthetic data structure object, a 1-dimensional data structure object by using the mixed data object in response to a failed access to the part of the data structure object.

4. The computer-implemented method of claim 1, wherein handling the data structure object includes manipulating values in the data structure object in a specified way, and creating the synthetic data structure object includes creating, as the synthetic data structure object, a 1- or 2-dimensional data structure object by using the mixed data object and manipulating values in the synthetic data structure object in the specified way.

5. The computer-implemented method of claim 1, wherein the execution of the target program comprises:
    executing the target program on a program processing environment, the program processing environment being configured to perform a creation of the synthetic data structure object by intervening in execution of a method to handle the data structure object in the target program.

6. The computer-implemented method of claim 2, further comprising:
    parsing the target program and/or a dataset corresponding to the target program to enumerate literals as the set of possible attribute names before the execution of the target program.

7. The computer-implemented method of claim 1, further comprising:
    outputting trace information relating to attribute names; and
    extracting dependency between the attribute names used in the target program by analyzing the trace information.

8. The computer-implemented method of claim 1, wherein the first data object is one of a numeric object and a string object and the second data object is other of the string object and the numeric object.

9. The computer-implemented method of claim 1, wherein the target program is selected from the group consisting of: code of handling tabular data, code of loop operation on an array, code of dynamically generating a column, and code of defining a function with dynamic typing.

10. The computer-implemented method of claim 1, further comprising:
    obtaining a target program handling the data structure object;
    injecting, into the target program, a first portion of code to incorporate a definition of the mixed data object that includes the first data object and the second data object, the mixed data object being configured to redirect the method call to the second data object in response to the first data object being unable to handle the method call; and
    injecting, into the target program, a second portion of code to incorporate a redefinition of a method for creating a synthetic data structure object by using the mixed data object instead of handling the data structure object in a manner instructed originally in the target program.

11. The computer-implemented method of claim 10, further comprising:
    injecting, into the target program, a third portion of code to incorporate a set of possible attribute names for the target program, wherein handling the data structure object includes reading structured data into the data structure object, and creating the synthetic data structure object includes creating, as the synthetic data structure object, a 2-dimensional data structure object with the set of possible attribute names by using the mixed data object.

12. The computer-implemented method of claim 10, wherein handling the data structure object includes accessing a part of the data structure object corresponding to a designation, and wherein the synthetic data structure object is a 1-dimensional data structure object by using the mixed data object in response to a failed access to the part of the data structure object.

13. The computer-implemented method of claim 10, wherein handling the data structure object includes manipulating values in the data structure object in a specified way, and creating the synthetic data structure object includes creating, as the synthetic data structure object, a 1- or 2-dimensional data structure object by using the mixed data object and manipulating values in the synthetic data structure object in the specified way.

14. The computer-implemented method of claim 10, further comprising:
parsing the target program and/or a dataset corresponding to the target program to enumerate observed literals as a set of possible attribute names; and/or
injecting instrumentation code to output trace information relating to attribute names, wherein the trace information is analyzed to extract dependency between the attribute names used in the target program.

15. A computer system for processing a target program, the computer system comprising:
a processor; and
a memory coupled to the processor, the processor being configured to:
responsive to, initiate execution of the target program handling a data structure object, execute a modified target program containing the target program at least in part, the modified target program includes code to incorporate a definition of the mixed data object, a redefinition of handling the data structure object and/or a set of possible attribute names, the redefinition defining to perform a creation of the synthetic data structure object in response to a method being called to handle the data structure object in the target program; and
create a synthetic data structure object by using a mixed data object instead of handling the data structure object in a manner instructed originally in the target program, wherein the mixed data object includes a first data object and a second data object and is configured to redirect a method call to the second data object in response to the first data object being unable to handle the method call.

16. The computer system of claim 15, wherein the processor is further configured to:
obtain the set of possible attribute names for the target program, wherein handling the data structure object includes reading structured data into the data structure object, and creating the synthetic data structure object includes creating, as the synthetic data structure object, a 2-dimensional data structure object with the set of possible attribute names by using the mixed data object.

17. The computer system of claim 15, wherein handling the data structure object includes accessing a part of the data structure object corresponding to a designation, and creating the synthetic data structure object includes creating, as the synthetic data structure object, a 1-dimensional data structure object by using the mixed data object in response to a failed access to the part of the data structure object.

18. The computer system of claim 15, wherein handling the data structure object includes manipulating values in the data structure object in a specified way, and creating the synthetic data structure object includes creating, as the synthetic data structure object, a 1- or 2-dimensional data structure object by using the mixed data object and manipulating values in the synthetic data structure object in the specified way.

19. A computer program product for processing a target program, the computer program product comprising a computer readable storage medium having program instructions embodied therewith, the program instructions executable by a computer to cause the computer to perform a computer-implemented method comprising:
responsive to initiating execution of the target program handling a data structure object, executing a modified target program containing the target program at least in part, the modified target program includes code to incorporate a definition of the mixed data object, a redefinition of handling the data structure object and/or a set of possible attribute names, the redefinition defining to perform a creation of the synthetic data structure object in response to a method being called to handle the data structure object in the target program; and
creating a synthetic data structure object by using a mixed data object instead of handling the data structure object in a manner instructed originally in the target program, the mixed data object includes a first data object and a second data object and being configured to redirect a method call to the second data object in response to the first data object being unable to handle the method call.

20. The computer program product of claim 19, further comprising:
obtaining the set of possible attribute names for the target program, wherein handling the data structure object includes reading structured data into the data structure object, and creating the synthetic data structure object includes creating, as the synthetic data structure object, a 2-dimensional data structure object with the set of possible attribute names by using the mixed data object.

* * * * *